(12) United States Patent
Wong

(10) Patent No.: US 9,274,554 B2
(45) Date of Patent: *Mar. 1, 2016

(54) PROTECTIVE CASE FOR ELECTRONIC EQUIPMENT

(71) Applicant: Chih-Juh Wong, New Taipei (TW)

(72) Inventor: Chih-Juh Wong, New Taipei (TW)

( * ) Notice: Subject to any disclaimer, the term of this patent is extended or adjusted under 35 U.S.C. 154(b) by 226 days.

This patent is subject to a terminal disclaimer.

(21) Appl. No.: 13/957,209

(22) Filed: Sep. 13, 2013

(65) Prior Publication Data

US 2015/0076186 A1     Mar. 19, 2015

(51) Int. Cl.
| | |
|---|---|
| *H05K 7/20* | (2006.01) |
| *G06F 1/16* | (2006.01) |
| *G06F 1/20* | (2006.01) |
| *H04B 1/3888* | (2015.01) |

(52) U.S. Cl.
CPC ............... *G06F 1/1628* (2013.01); *G06F 1/20* (2013.01); *H04B 1/3888* (2013.01); *Y10S 977/833* (2013.01)

(58) Field of Classification Search
CPC .. H05K 7/2039; Y10S 977/833; B82Y 99/00; G06F 1/1628; G06F 1/20; H04B 1/3888
USPC ........ 361/679.46–679.54, 688–723; 206/307, 206/320, 472; 165/80.2; 224/191; 977/833
See application file for complete search history.

(56) References Cited

U.S. PATENT DOCUMENTS

| | | | | |
|---|---|---|---|---|
| 8,355,248 B2* | 1/2013 | Nishi | ...................... | G06F 1/203 165/185 |
| 8,960,421 B1* | 2/2015 | Diebel | ...................... | G06F 1/00 206/320 |
| 2014/0000844 A1* | 1/2014 | Chandaria | ............ | H05K 7/2039 165/80.2 |
| 2014/0110083 A1* | 4/2014 | Cheng | ................... | A45C 11/00 165/47 |
| 2015/0034291 A1* | 2/2015 | Wong | ........................ | G06F 1/20 165/185 |
| 2015/0036291 A1* | 2/2015 | Yuan | ...................... | G06F 1/628 361/690 |
| 2015/0041341 A1* | 2/2015 | Marshall | ................ | A45C 11/00 206/45.2 |
| 2015/0065208 A1* | 3/2015 | Balaji | ..................... | H04M 1/04 455/575.8 |
| 2015/0153791 A1* | 6/2015 | Wong | ........................ | G06F 1/20 361/679.54 |

* cited by examiner

*Primary Examiner* — Anthony Haughton
*Assistant Examiner* — Yahya Ahmad

(57) ABSTRACT

A protective case for electronic equipment is used to dissipate heat of electronic equipment. The protective case contains a body including a through hole defined therein and a metal plate disposed in the through hole, a Nano heat dissipation layer formed on a back surface of the metal plate, such that the electronic equipment retains with a protective case and contacts with the metal plate. The metal plate has an external rim retained in the body. The body also includes a recess defined thereon, and the metal plate adheres with the recess. The protective case also contains a dissipating piece, and a back surface of the dissipating piece connects with a front surface of the metal plate, a front surface of the dissipating piece contacts with the electronic equipment.

12 Claims, 8 Drawing Sheets

PROTECTIVE CASE FOR ELECTRONIC EQUIPMENT

FIELD OF THE INVENTION

The present invention relates to a protective case for electronic equipment which is used to dissipate heat of electronic equipment.

BACKGROUND OF THE INVENTION

A conventional protective case is applied to prevent electronic equipment from scratch, so it contacts with an upper surface and a lower surface of the electronic equipment tightly. However, such a contacting way will stop heat of the electronic equipment from being dissipated. To solve this problem, the protective case is removed from the electronic equipment, thus losing the protective case easily.

The present invention has arisen to mitigate and/or obviate the afore-described disadvantages.

SUMMARY OF THE INVENTION

The primary object of the present invention is to provide a protective case for electronic equipment which dissipates heat of the electronic equipment to the air quickly.

Another object of the present invention is to provide a protective case for electronic equipment in which a Nano heat dissipation layer is applied to prevent the electronic equipment from releasing electromagnetic radiation, thus protecting the user's health To obtain the above objectives, a protective case for electronic equipment contains a body including a through hole defined therein and a metal plate disposed in the through hole, a Nano heat dissipation layer formed on a back surface of the metal plate, such that the electronic equipment retains with a protective case and contacts with the metal plate.

Preferably, the metal plate has an external rim retained in the body.

Preferably, the body also includes a recess defined thereon, and the metal plate adheres with the recess.

Preferably, the protective case for the electronic equipment further comprises a dissipating piece, wherein a back surface of the dissipating piece connects with a front surface of the metal plate, and a front surface of the dissipating piece contacts with the electronic equipment.

Preferably, the metal plate has an external rim extending outwardly to an inner side of the body, and an area of the metal plate is larger than that of the dissipating piece.

Preferably, the dissipating piece has a heat conducting layer, a carrying layer, and a heat removing layer; the carrying layer has a first face and a second face opposite to the first face, the heat conducting layer is in connection with the first face of the carrying layer, the heat removing layer couples with the second face of the carrying layer, and the heat removing layer connects with the second face of the carrying layer, the heat removing layer contacts with the electronic equipment so that heat of the electronic equipment is conducted to the carrying layer quickly, and then the heat conducts to the metal plate through the heat removing layer.

Preferably, the body includes a protecting rib extending upwardly from a bottom end thereof; the protecting rib includes a locking portion bending inwardly from a free end thereof; and among the body, the protecting rib, and the locking portion is defined a receiving chamber so as to receive the electronic equipment, the locking portion retains with the electronic equipment.

Preferably, one of four outer sides of the protecting rib has a first guiding slot being concaved downwardly therealong and corresponding to a speaker, and the locking portion has a plurality of sound orifices formed thereon and corresponding to the first guiding slot.

Preferably, anther of the four outer sides of the protecting rib has a second guiding slot being concaved downwardly therealong and corresponding to a microphone, the locking portion also has a plurality receiving orifices formed thereon and corresponding to the second guiding slot.

Preferably, the body includes a plurality of locking elements mounted thereon so as to mate with the electronic equipment.

Preferably, the protective case for the electronic equipment further comprises a cover connected with the body, wherein the cover has plural crease lines pre-pressed thereon so as to form a support seat of the body.

Preferably, the plural crease lines are pre-pressed in any one of a radiation shape, a Y shape, and a combined shape of plural triangles and polygons.

DETAILED DESCRIPTION OF THE PREFERRED EMBODIMENTS

Figure 1:
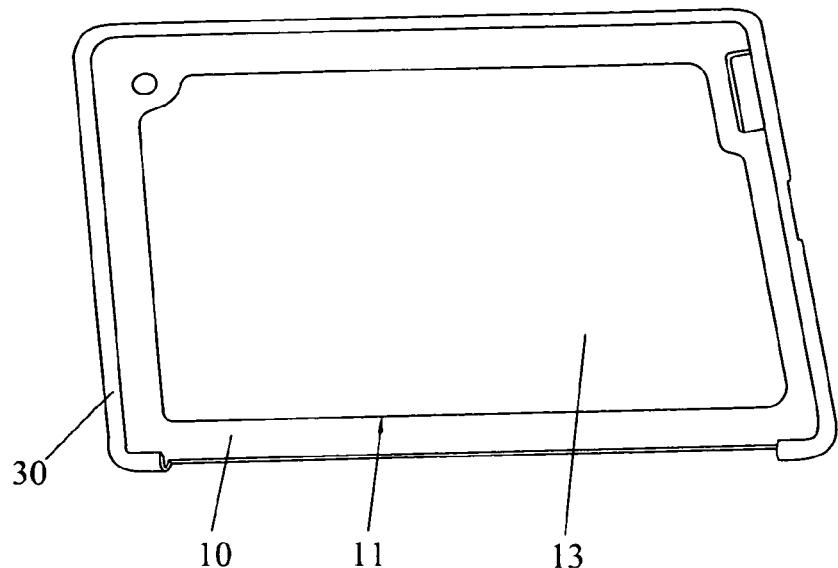
FIG. 1 is a perspective view showing the assembly of a protective case for electronic equipment according to a first embodiment of the present invention.
Figure 2:
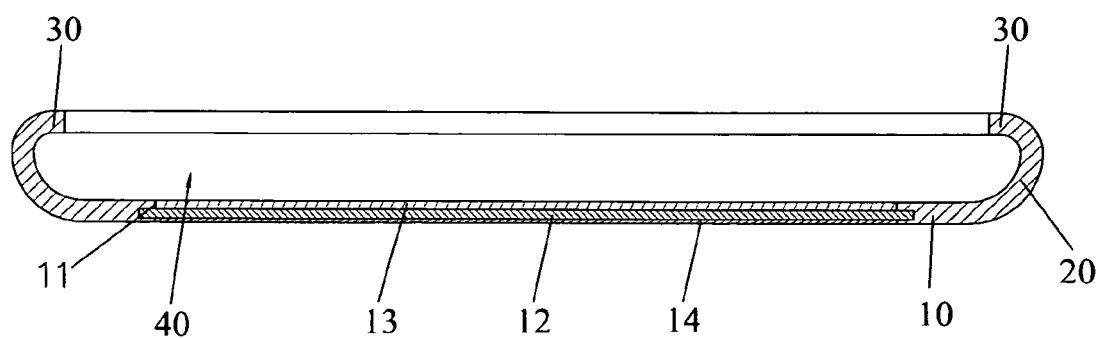
FIG. 2 is a cross sectional view of FIG. 1.
Figure 3:
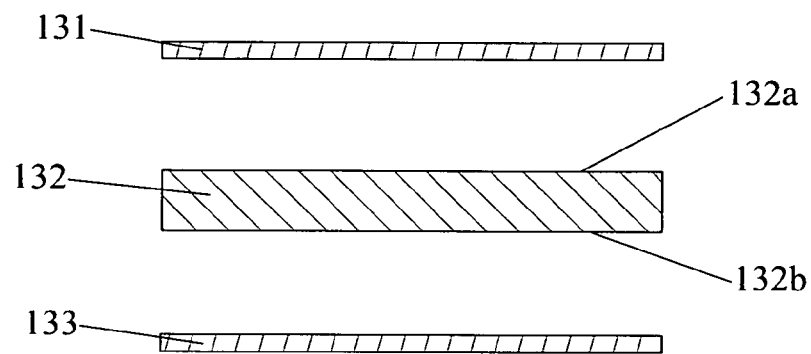
FIG. 3 is an amplified cross sectional view showing a dissipating piece of FIG. 2.

Referring further to FIGS. 1-3, a protective case 1 for electronic equipment according to a first embodiment of the present invention is used to protect electronic equipment, dissipate heat, and prevent from electromagnetic radiation.

The protective case 1 comprises: a body 10, and the body 10 including a protecting rib 20 extending upwardly from a bottom end thereof; a retaining structure for retaining with electronic equipment, and the retaining structure including a locking portion 30 bending inwardly from a free end of the protecting rib 20; a receiving chamber 40 defined among the body 10, the protecting rib 20, and the locking portion 30 so as to receive the electronic equipment, such that after the electronic equipment is received in the receiving chamber 40, the locking portion 30 retains with the electronic equipment.

The retaining structure can be other components, such as, a plurality of locking elements mounted on the body 10 for mating with the electronic equipment so that the protective case 1 connects with the electronic equipment.

In addition, the body 10 also includes a through hole 11 defined therein and a metal plate 12 disposed in the through hole 11, a Nano heat dissipation layer 14 formed on a back surface of the metal plate 12. i.e., the Nano heat dissipation layer 14 located at an outer surface of the protective case 1, such that the electronic equipment is received in the receiving chamber 40 and contacts with the metal plate 12, thus dissipating heat of the electronic equipment via the metal plate 12 and the Nano heat dissipation layer 14. Also, the Nano heat dissipation layer 14 can prevent electromagnetic radiation.

The metal plate 12 has an external rim retained in the body 10 and the Nano heat dissipation layer 14 formed on the back surface thereof, wherein an area of the Nano heat dissipation layer 14 corresponds to a size of the through hole 11, such that the metal plate 12 conducts heat of the electronic equipment in the receiving chamber 40 to the Nano heat dissipation layer 14, and then the Nano heat dissipation layer 14 dissipates the heat to air. Preferably, the metal plate 12 is made of any one of aluminum, silver and copper.

Preferably, the metal plate 12 also has a dissipating piece 13 arranged on a front surface thereof and fixed in the receiving chamber 40, wherein a back surface of the dissipating piece 13 connects with the front surface of the metal plate 12, and a front surface of the dissipating piece 13 contacts with the electronic equipment, wherein an area of the metal plate 12 is larger than that of the dissipating piece 13. Since the metal plate 12 has heat conductivity and its area is larger than that of the dissipating piece 13, the heat of the electronic equipment removes to air via the metal plate 12.

As shown in FIG. 3, the dissipating piece 13 has a heat conducting layer 131, a carrying layer 132, and a heat removing layer 133. The carrying layer 132 has a first face 132a and a second face 132b opposite to the first face 132a, the heat conducting layer 131 is in connection with the first face 132a of the carrying layer 132, the heat removing layer 133 couples with the second face 132b of the carrying layer 132, and the heat removing layer 133 connects with the second face 132b of the carrying layer 132, the heat removing layer 133 joins with the front surface of the metal plate 12, such that the heat removing layer 131 contacts with the electronic equipment so that the heat of the electronic equipment is conducted to the carrying layer 132 quickly, and then the heat conducts to the metal plate 12 through the heat removing layer 133.

It is preferred that the dissipating piece 13 has a film formed on the front surface thereof and made of metal material, such as silver. In addition, the film can be also made of other heat conducting material.

Figure 4:
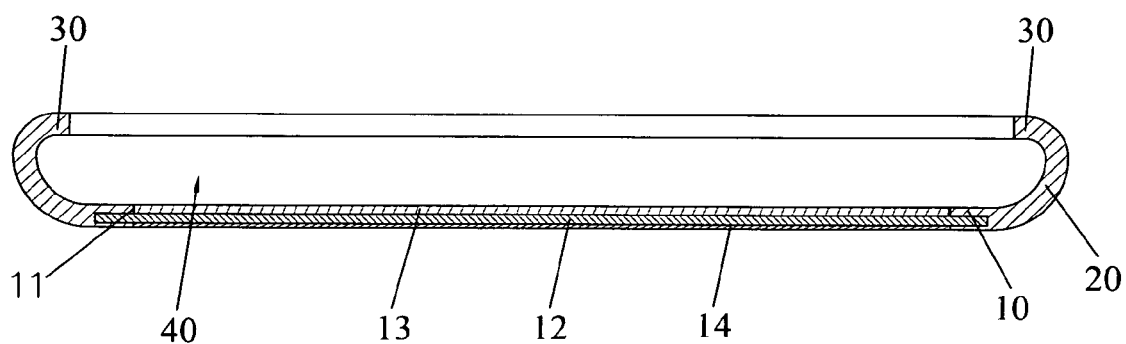
FIG. 4 is a cross sectional view showing the assembly of a protective case for electronic equipment according to a second embodiment of the present invention.

Referring to FIG. 4, a difference of a protective case 1 of a second embodiment from that of the first embodiment comprises: a metal plate 12 having an external rim extending outwardly to an inner side of the body 10, wherein an area of the metal plate 12 of the second embodiment is larger than that of the metal plate 12 of the first embodiment, thus conducting heat excellently.

Figure 5:
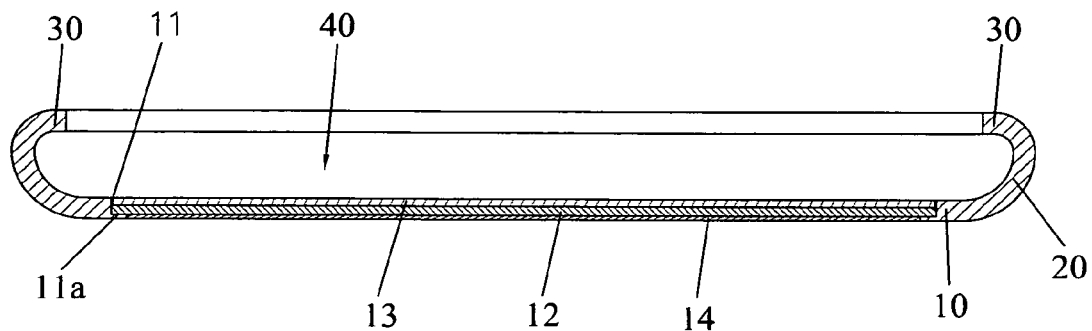
FIG. 5 is a cross sectional view showing the assembly of a protective case for electronic equipment according to a third embodiment of the present invention.

As illustrated in FIG. 5, a difference of a protective case 1 of a third embodiment from that of the first embodiment comprises: a body 10 including a through hole 11, and the through hole 11 having a stepped recess 11a being concaved downwardly along a peripheral side thereof; a metal plate 12 having a back surface, and the back surface of the metal plate 12 having an outer fringe, such that the outer fringe of the back surface of the metal plate 12 adheres with the stepped recess 11a, and wherein an area of the back surface of the metal plate 12 besides the outer fringe of the back surface of the metal plate 12 has a Nano heat dissipation layer 14 fixed thereon, the Nano heat dissipation layer 14 has a dissipating piece 13 arranged on a front surface thereof.

Figure 6:
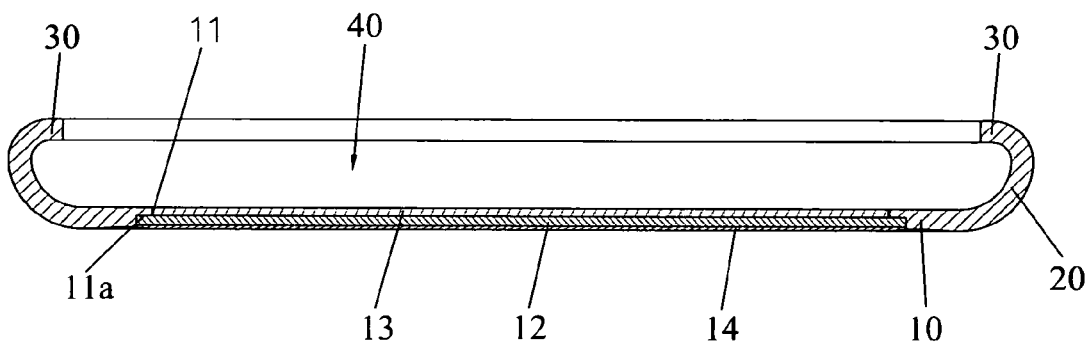
FIG. 6 is a cross sectional view showing the assembly of a protective case for electronic equipment according to a fourth embodiment of the present invention.

As shown in FIG. 6, a difference of a protective case 1 of a fourth embodiment from that of the first embodiment comprises: a body 10 including a through hole 11, and the through hole 11 having a stepped recess 11a being concaved upwardly along a peripheral side thereof, such that an outer fringe of a front surface of a metal plate 12 adheres with the stepped recess 11a, and wherein the front surface of the metal plate 12 has the dissipating piece 13 arranged thereon, a back surface of the metal plate 12 has a Nano heat dissipation layer 14 formed thereon.

Figure 7:
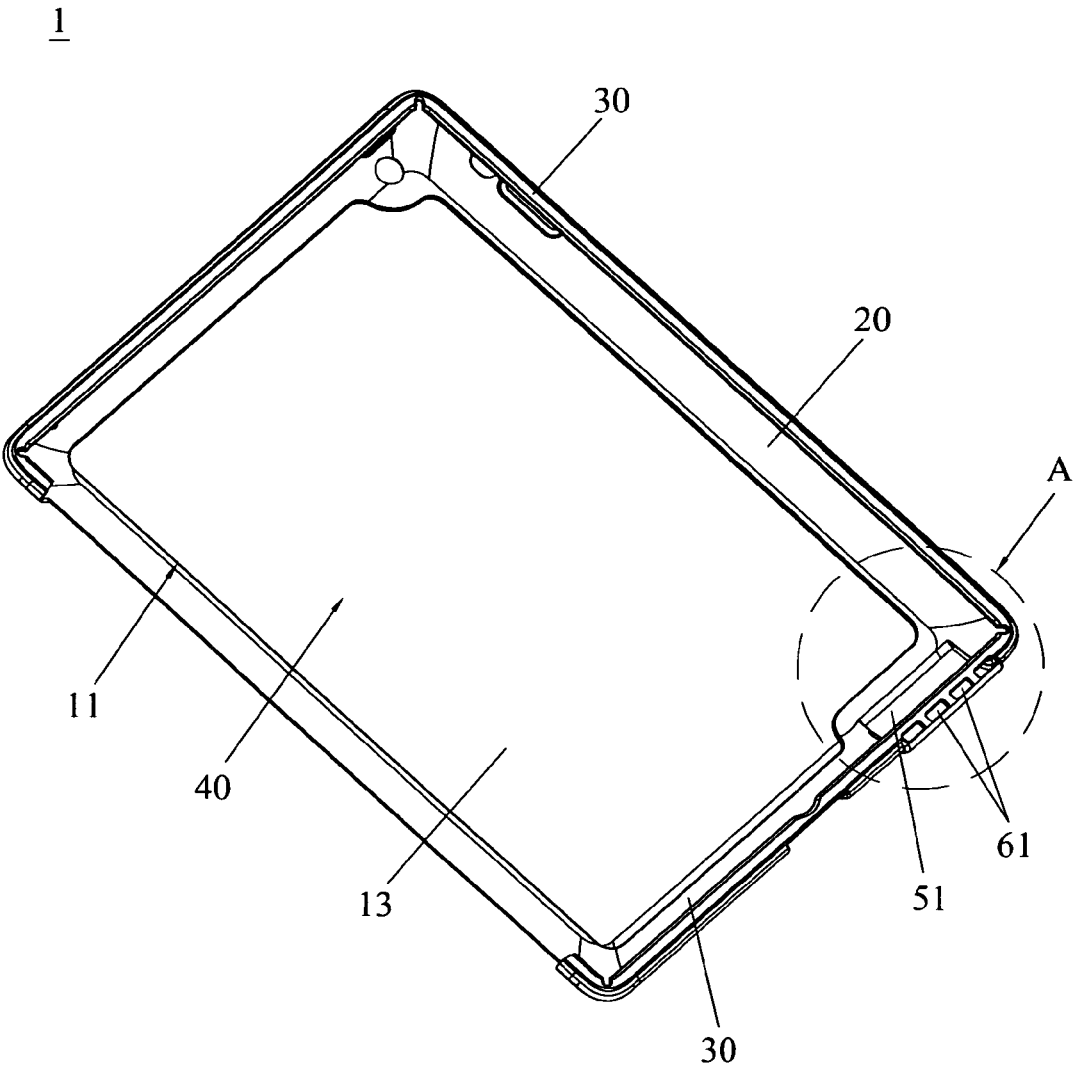
FIG. 7 is a perspective view showing the assembly of a protective case for electronic equipment according to a fifth embodiment of the present invention.
Figure 8:
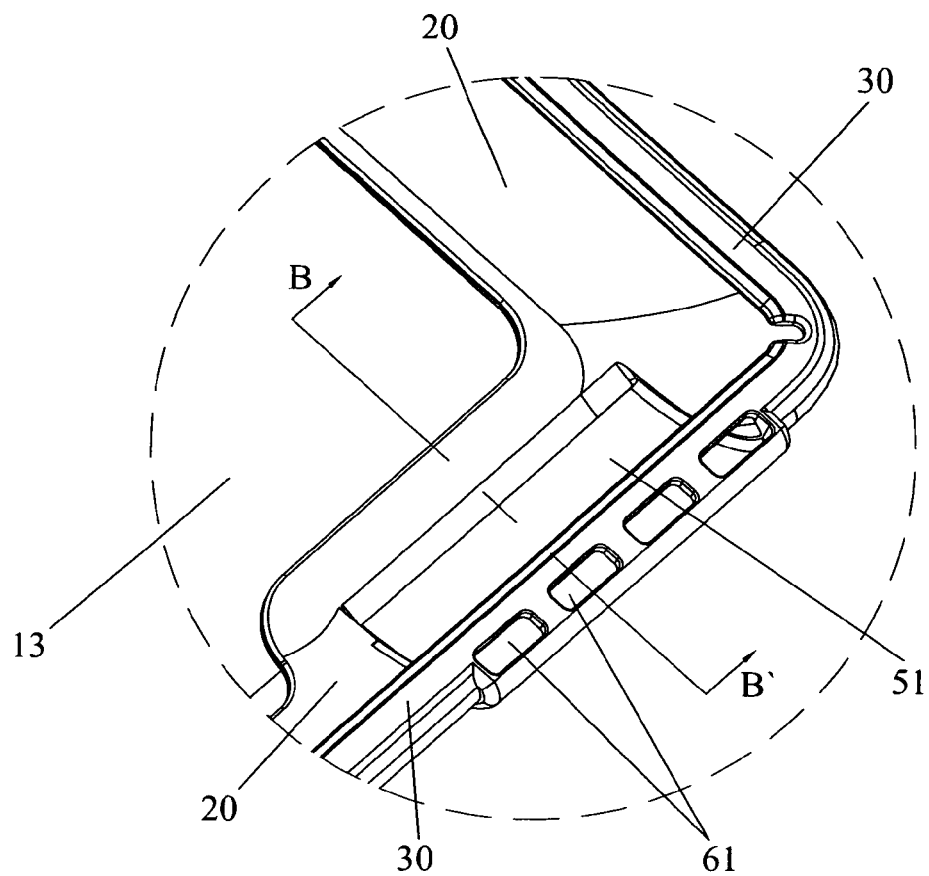
FIG. 8 is an amplified perspective view of a part A of FIG. 7.
Figure 9:
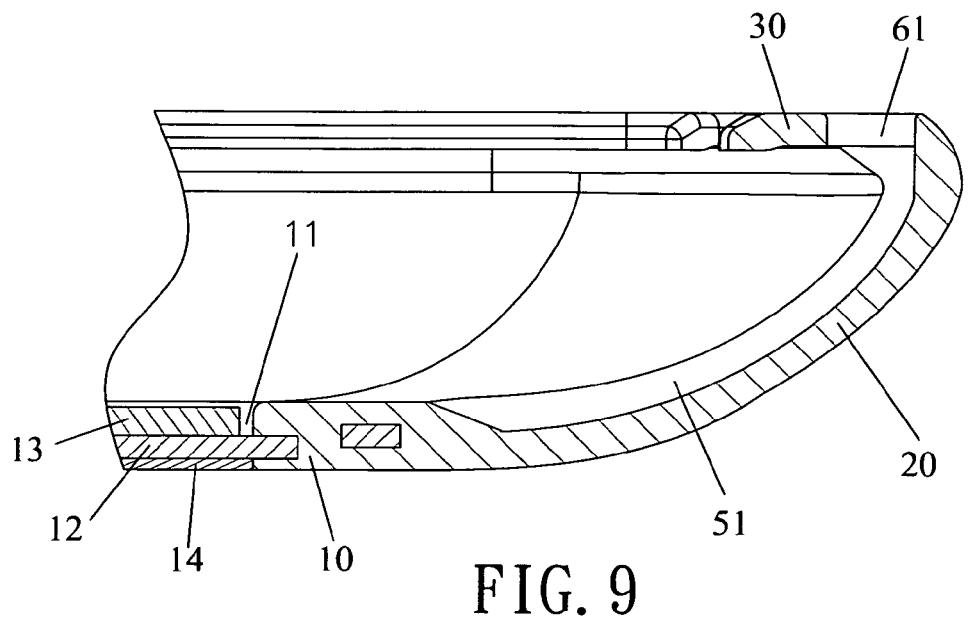
FIG. 9 is a cross sectional view taken along the line B-B' of FIG. 8.
Figure 10:
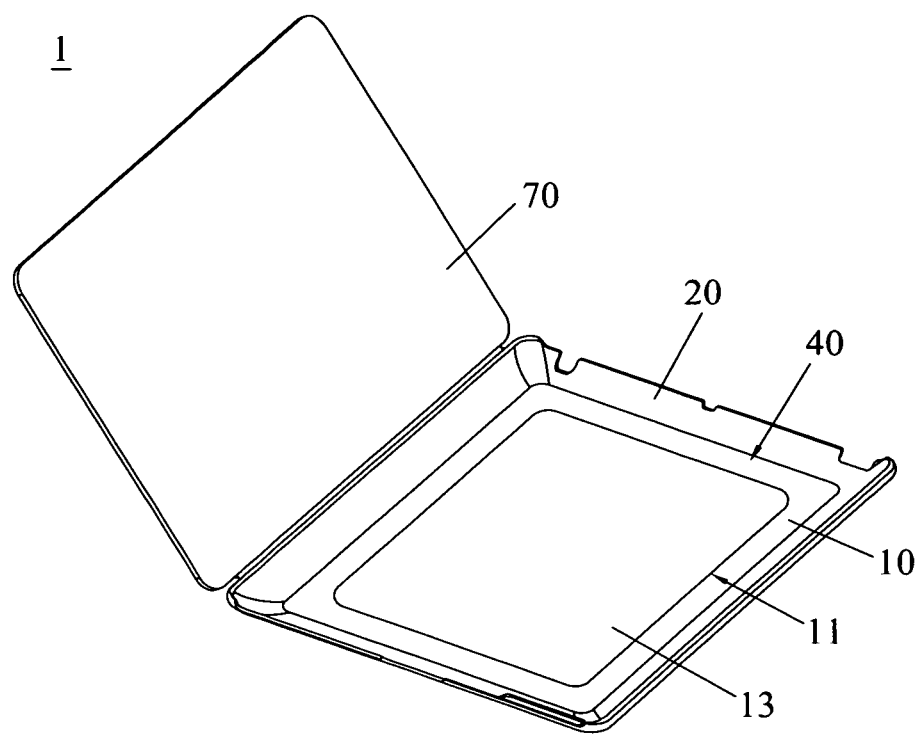
FIG. 10 is a perspective view showing the assembly of a protective case for electronic equipment according to a sixth embodiment of the present invention.
Figure 11:
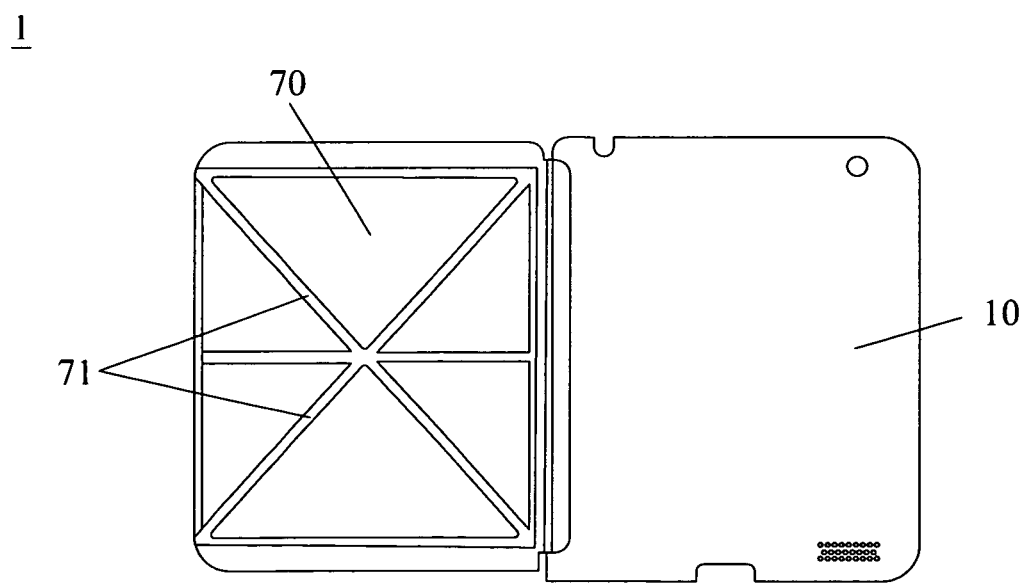
FIG. 11 is a plan view of FIG. 10.
Figure 12:
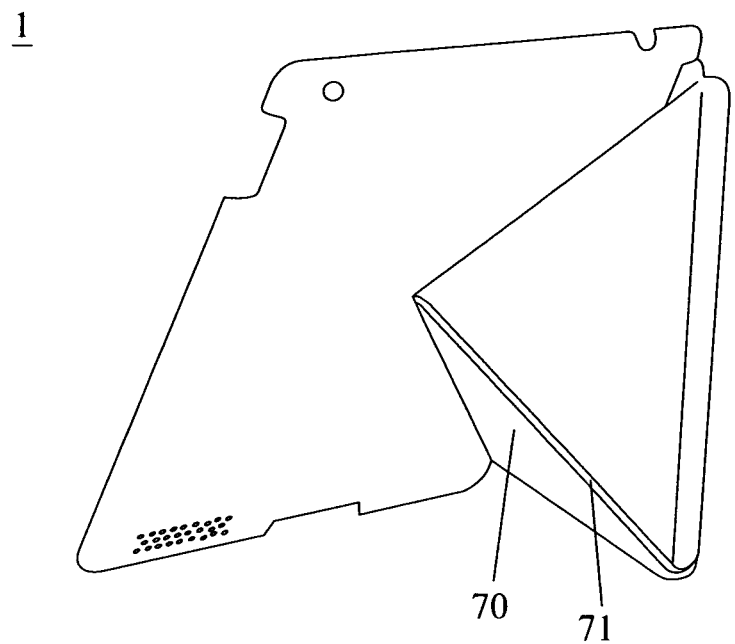
FIG. 12 is a perspective view showing the operation of the protective case for the electronic equipment according to the sixth embodiment of the present invention.
Figure 13:
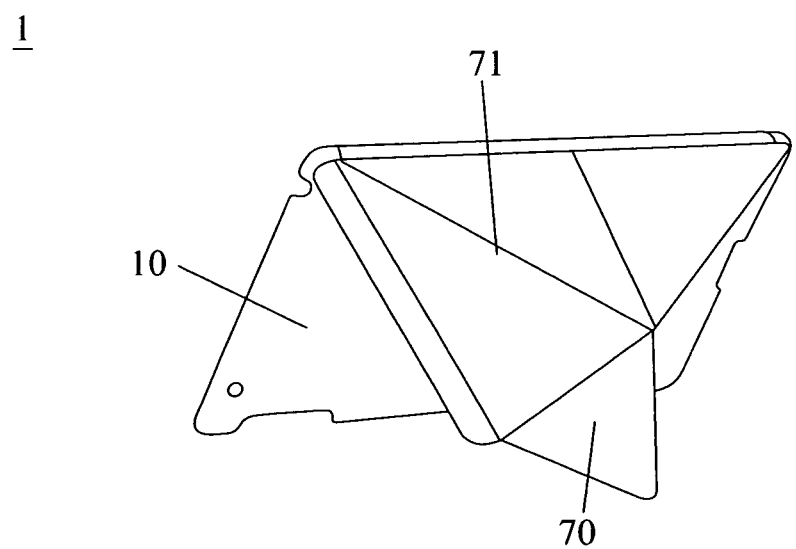
FIG. 13 is another perspective view showing the operation of the protective case for the electronic equipment according to the sixth embodiment of the present invention.

With reference to FIGS. 7 to 9, a protective case 1 for electronic equipment according to a fifth embodiment of the present invention comprises: a body 10, and the body 10 including a protecting rib 20 extending upwardly from a bottom end thereof; a locking portion 30 bending inwardly from a free end of the protecting rib 20; a receiving chamber 40 defined among the body 10, the protecting rib 20, and the locking portion 30 so as to receive the electronic equipment; wherein the body 10 also includes a through hole 11 for fixing any one of the metal plates 12, the dissipating pieces 13, and the Nano heat dissipation layer 14 of the above-mentioned embodiments of the present invention.

It is to be noted that the retaining structure can be other components, such that, a locking element mounted on the body 10 for mating with the electronic equipment so that the protective case 1 connects with the electronic equipment.

When the protective case 1 is fitted on the electronic equipment, a speaker and a microphone of the electronic equipment correspond to one or two of four outer sides of the electronic equipment.

When the speaker and the microphone correspond to two of four outer sides of the protecting rib 20, one of two outer sides of the protecting rib 20 has a first guiding slot 51 being concaved downwardly therealong and corresponding to the speaker, and the locking portion 30 has a plurality sound orifices 61 formed thereon and corresponding to the first guiding slot 51; and anther of the two outer sides of the protecting rib 20 has a second guiding slot (not shown) being concaved downwardly therealong and corresponding to the microphone, the locking portion 30 also has a plurality receiving orifices (not shown) formed thereon and corresponding to the second guiding slot. In addition, when the speaker and the microphone are located on a same outer side of the electronic equipment, one outer side of the protecting rib 20 has a first guiding slot 51 and a second guiding slot (not shown) corresponding to the speaker and the microphone, and the locking portion 30 has a plurality sound orifices 61 formed thereon and corresponding to the first guiding slot 51, the locking portion 30 also has a plurality receiving orifices (not shown) formed thereon and corresponding to the second guiding slot. Thereby, sounds transmit out of the plurality of sound orifices 61 from the speaker via the first guiding slot 51 so as to produce heavy bass, and sounds spreading to a back surface of the electronic equipment are conducted to a front surface of the electronic equipment and then transmits out of the plurality of sound orifices 61, hence the electronic equipment produces sounds loudly. It is to be noted that after a user makes sounds, the sounds are conducted to the second guiding slot through the plurality of receiving orifices and then transmit to the microphone from the second guising slot, thus collecting the sounds together.

Furthermore, one outer side of the protecting rib 20 corresponding to the microphone has a second guiding slot (not shown) being concaved downwardly therealong and corresponding to the speaker, and the locking portion 30 has a plurality receiving orifices (not shown) formed thereon and corresponding to the second guiding slot; when the speaker and the microphone are located on a same outer side of the electronic equipment, one outer side of the protecting rib 20 has a first guiding slot 51 and a second guiding slot (not shown) corresponding to the speaker and the microphone, and the locking portion 30 has a plurality sound orifices 61 formed thereon and corresponding to the first guiding slot 51, the locking portion 30 also has a plurality receiving orifices (not shown) formed thereon and corresponding to the second guiding slot. Thereby, sounds transmit out of the plurality of sound orifices 61 from the speaker via the first guiding slot 51 so as to produce heavy bass, and sounds spreading to a back surface of the electronic equipment are conducted to a front surface of the electronic equipment and then transmit out of the plurality of sound orifices 61, hence the electronic equipment produces sounds loudly. It is to be noted that after the user makes sounds, the sounds are conducted to the second guiding slot through the plurality of receiving orifices and then transmit to the microphone from the second guising slot, thus collecting the sounds together.

Preferably, the dissipating piece 13 has a film formed on the front surface thereof and made of metal material, such as silver and copper. In addition, the film can be also made of other heat conducting material.

The protecting rib 20 and the locking portion 30 are made of elastic material, such as plastic, such that the electronic equipment is fixed in the protective case 1 easily and securely. Of course, a respective one of the body 10 and the protecting rib 20 also has a buffer layer formed on an outer side thereof so as to absorb external stress and to obtain anti-slip effect, thus protecting the electronic equipment.

Referring further to FIGS. 10-13, a protective case 1 for electronic equipment according to a sixth embodiment of the present invention comprises a body 10 and a cover 70 connected with the body 10. The body 10 includes components according to any one of above-mentioned embodiments.

Moreover, the cover 70 has plural crease lines 71 prepressed thereon such that the user folds the plural crease lines 71 so as to form a support seat of the body 10, and then the electronic equipment received in the body 10 is erected, thereby operating and viewing the electronic equipment conveniently.

The crease lines 71 are pre-pressed in a radiation shape.

Figure 14:
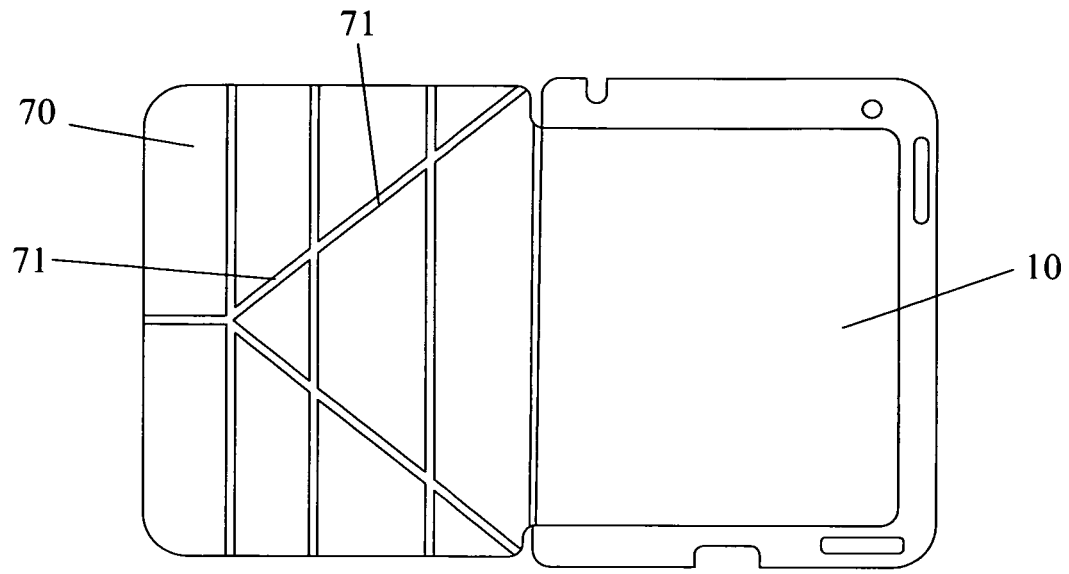
FIG. 14 is a plan view showing the assembly of a protective case for electronic equipment according to a seventh embodiment of the present invention.

As shown in FIG. 14, a difference of a protective case 1 of a seventh embodiment from that of the sixth embodiment comprises: a cover 17 having plural crease lines 71 pre-pressed in a Y shape thereon.

Figure 15:
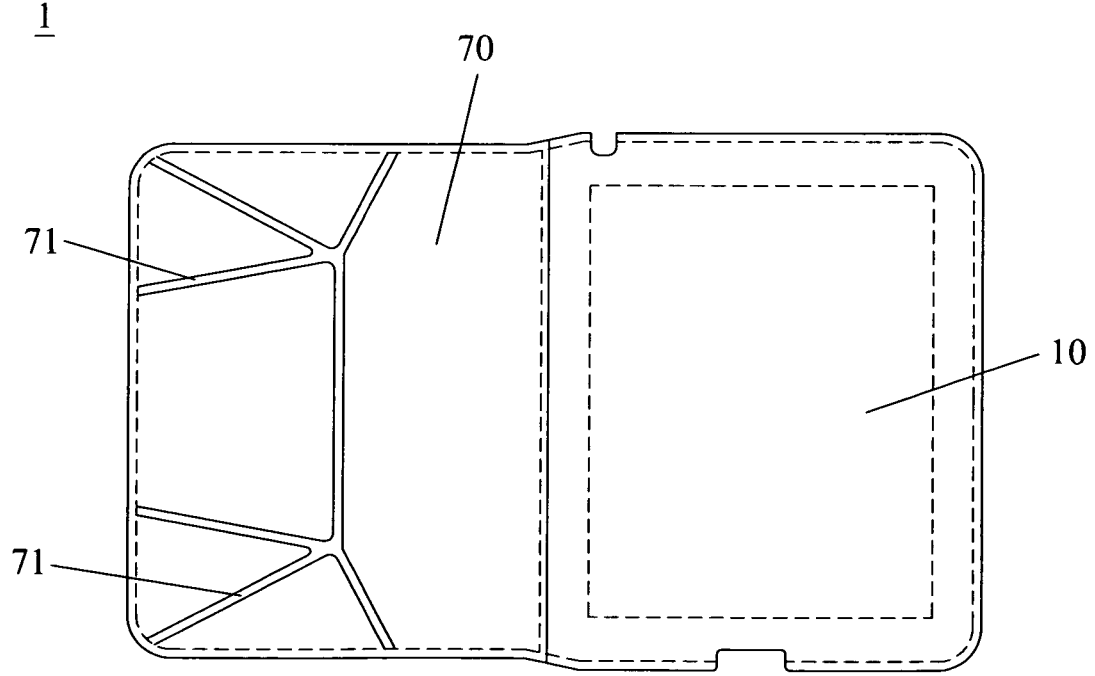
FIG. 15 is a plan view showing the assembly of a protective case for electronic equipment according to an eighth embodiment of the present invention.

As illustrated in FIG. 15, a difference of a protective case 1 of an eighth embodiment from that of the sixth embodiment comprises: a cover 17 having plural crease lines 71 pre-pressed in a combined shape of plural triangles and polygons.

It is preferable that the cover 70 has a leather layer formed thereon so as to have anti-slip effect, aesthetics appearance, and buffer function. In addition, the leather layer of the cover 70 also has a plastic film made of Polyethylene Terephthalate (PET) so as to achieve scratch resistance.

Thereby, the protective case of the present invention has the following advantages:

1. The heat of the electronic equipment is dissipated to the air quickly by ways of the metal plate 12 and the Nano heat dissipation layer 14, thus prolonging service life of the electronic equipment.

2. The Nano heat dissipation layer 14 is applied to prevent the electronic equipment from releasing electromagnetic radiation, thus protecting the user's health.

It is to be noted that the protective case of the present invention is also suitable for television and tablet PCs, etc.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A protective case for electronic equipment being used to dissipate heat of electronic equipment and comprising:
a body, and the body including a through hole defined therein and a metal plate disposed in the through hole, a Nanomaterial heat dissipation layer formed on a back surface of the metal plate, such that the electronic equipment retains with a protective case and contacts with the metal plate.

2. The protective case for the electronic equipment as claimed in claim 1, wherein the metal plate has an external rim retained in the body.

3. The protective case for the electronic equipment as claimed in claim 1, wherein the body also includes a recess defined thereon, and the metal plate adheres with the recess.

4. The protective case for the electronic equipment as claimed in claim 1 further comprises a dissipating piece, wherein a back surface of the dissipating piece connects with a front surface of the metal plate, and a front surface of the dissipating piece contacts with the electronic equipment.

5. The protective case for the electronic equipment as claimed in claim 4, wherein the metal plate has an external rim extending outwardly to an inner side of the body, and an area of the metal plate is larger than that of the dissipating piece.

6. The protective case for the electronic equipment as claimed in claim 4, wherein the dissipating piece has a heat conducting layer, a carrying layer, and a heat removing layer; the carrying layer has a first face and a second face opposite to the first face, the heat conducting layer is in connection with the first face of the carrying layer, the heat removing layer couples with the second face of the carrying layer, and the heat removing layer connects with the second face of the carrying layer, the heat removing layer contacts with the electronic equipment so that heat of the electronic equipment is conducted to the carrying layer quickly, and then the heat conducts to the metal plate through the heat removing layer.

7. The protective case for the electronic equipment as claimed in claim 1, wherein the body includes a protecting rib extending upwardly from a bottom end thereof; the protecting rib includes a locking portion bending inwardly from a free end thereof; and among the body, the protecting rib, and the locking portion is defined a receiving chamber so as to receive the electronic equipment, the locking portion retains with the electronic equipment.

8. The protective case for the electronic equipment as claimed in claim 7, wherein one of four outer sides of the protecting rib has a first guiding slot being concaved downwardly therealong and corresponding to a speaker, and the locking portion has a plurality of sound orifices formed thereon and corresponding to the first guiding slot.

9. The protective case for the electronic equipment as claimed in claim 7, wherein another of the four outer sides of the protecting rib has a second guiding slot being concaved downwardly therealong and corresponding to a microphone, the locking portion also has a plurality receiving orifices formed thereon and corresponding to the second guiding slot.

10. The protective case for the electronic equipment as claimed in claim 1, wherein the body includes a plurality of locking elements mounted thereon so as to mate with the electronic equipment.

11. The protective case for the electronic equipment as claimed in claim 1 further comprising a cover connected with the body, wherein the cover has plural crease lines pre-pressed thereon so as to form a support seat of the body.

12. The protective case for the electronic equipment as claimed in claim 11, wherein the plural crease lines are pre-pressed in any one of a radiation shape, a Y shape, and a combined shape of plural triangles and polygons.

* * * * *